(12) United States Patent
Jiang et al.

(10) Patent No.: US 10,985,652 B1
(45) Date of Patent: Apr. 20, 2021

(54) POWER BALANCER FOR SERIES-CONNECTED LOAD ZONES OF AN INTEGRATED CIRCUIT

(71) Applicant: Google LLC, Mountain View, CA (US)

(72) Inventors: Shuai Jiang, Saratoga, CA (US); Gregory Sizikov, Sunnyvale, CA (US); Mikhail Popovich, Danville, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/806,521

(22) Filed: Mar. 2, 2020

(51) Int. Cl.
*G05F 1/577* (2006.01)
*H02M 3/07* (2006.01)
*G05F 1/613* (2006.01)
*G05F 1/62* (2006.01)
*G05F 1/618* (2006.01)

(52) U.S. Cl.
CPC .............. *H02M 3/07* (2013.01); *G05F 1/577* (2013.01); *G05F 1/613* (2013.01); *G05F 1/618* (2013.01); *G05F 1/62* (2013.01)

(58) Field of Classification Search
CPC .. H02M 3/07; H02M 3/06; G05F 1/46; G05F 1/577; G05F 1/61; G05F 1/613; G05F 1/618; G05F 1/62; G05F 3/02; G05F 3/08; G05F 3/16; G05F 3/185; G06F 1/26
See application file for complete search history.

(56) References Cited

U.S. PATENT DOCUMENTS

| | | | |
|---|---|---|---|
| 5,862,047 A | 1/1999 | Elsener | |
| 6,438,462 B1 | 8/2002 | Hanf et al. | |
| 7,642,758 B2 | 1/2010 | Morong et al. | |
| 8,635,476 B2 | 1/2014 | Henry et al. | |
| 8,739,106 B2 | 5/2014 | Tong et al. | |
| 8,892,931 B2 | 11/2014 | Kruglick | |
| 9,235,252 B2 | 1/2016 | Shrall et al. | |
| 9,318,952 B2 | 4/2016 | Oraw et al. | |
| 10,696,182 B2 * | 6/2020 | Khaligh | H01F 3/14 |
| 2007/0262759 A1 | 11/2007 | Burton et al. | |
| 2013/0219196 A1 | 8/2013 | Finkelstein et al. | |
| 2014/0380070 A1 | 12/2014 | Hua | |
| 2017/0229961 A1 | 8/2017 | Zhang et al. | |

* cited by examiner

*Primary Examiner* — Jung Kim
(74) *Attorney, Agent, or Firm* — Fish & Richardson P.C.

(57) ABSTRACT

This disclosure relates to power balancer circuits that enable multiple load zones of an IC to be powered in series while maintaining balanced voltage at each load zone. In one aspect, a circuit includes load zones that are powered in series. The circuit includes a power balancer for balancing a voltage across each load zone. The power balancer includes an equivalent DC transformer array that includes, for each load zone, an equivalent DC transformer connected in parallel with the load zone. The power balancer includes, for each load zone, a bus capacitor connected in parallel with the load zone. Each equivalent DC transformer is electrically connected to each other equivalent DC transformer providing an electrical path for each bus capacitor to discharge current to each other bus capacitor when a voltage across a bus capacitor is greater than a voltage across another bus capacitor.

20 Claims, 5 Drawing Sheets

POWER BALANCER FOR SERIES-CONNECTED LOAD ZONES OF AN INTEGRATED CIRCUIT

BACKGROUND

Traditional power delivery for microprocessors incorporates a voltage regulator that sits next to the chip on the motherboard and a passive delivery network (PDN) from the voltage regulator all the way to the chip die. As the power and current of modern microprocessors keep increasing, this form of power delivery becomes extremely inefficient. For example, a processor running at 0.8V and 1000 A can require 24 phases of voltage regulator power stages to convert from a 12V input down to the 0.8V of the processor. The power conversion loss can easily reach or exceed 10%.

Due to the bulky size of voltage regulators, it often needs to sit a few inches away from the chip such that the I2R loss (or DC IR drop loss) of the PDN can become very significant as well. Thus, the total power conversion and power delivery efficiency can be in the ballpark of 75-85%, resulting in significant electricity cost. Furthermore, high current application-specific integrated circuit (ASIC) packages can reach the ball grid array (BGA) electromigration (EM) limit such that it either limits the amount of current that can be delivered into the chip package or jeopardize the package reliability.

SUMMARY

This specification describes technologies relating to power balancer circuits that enable multiple load zones of an IC to be powered in series while maintaining balanced voltage at each load zone.

In general, one innovative aspect of the subject matter described in this specification can be embodied in circuits that include load zones that are powered in series, each load zone being fabricated on a common integrated circuit; and a power balancer for balancing a voltage across each load zone, the power balancer including: an equivalent DC transformer array that includes, for each load zone, an equivalent DC transformer connected in parallel with the load zone; and for each load zone, a bus capacitor connected in parallel with the load zone; wherein each equivalent DC transformer is electrically connected to each other equivalent DC transformer providing an electrical path for each bus capacitor to discharge current to each other bus capacitor when a voltage across a bus capacitor is greater than a voltage across another bus capacitor.

These and other implementations can each optionally include one or more of the following features. In some aspects, each equivalent DC transformer includes a switched capacitor circuit that includes a pair of switches that includes a first switch and a second switch and the first switch and the second switch are operated complementary such that when the first switches are on, the second switches are off and when the second switches are on, the first switches are off.

Some aspects, include a controller configured to repeatedly turn the first and second switches on and off according to a specified duty cycle. Each switch can include a metal-oxide-semiconductor field-effect transistor. The power balancer can include a transformer for each load zone. The transformer for each load zone is connected between a terminal of the first switch for the load zone and the second switch for the load zone.

In some aspects, the power balancer is fabricated on the integrated circuit. The power balancer is mounted on a circuit board with the integrated circuit. The power balancer can include an individual voltage regulator for each load zone. The individual voltage regulator for each load zone is connected between the bus capacitor for the load zone and an input power connection to the load zone. In some aspects, each load zone is a processor core.

In general, another aspect of the subject matter described in this specification can be embodied in circuits that include load zones that are powered in series, each load zone being fabricated on a common integrated circuit; and a power balancer for balancing a voltage across each load zone, the power balancer including: a switched capacitor circuit that includes, for each load zone, a pair of switches that includes a first switch and a second switch, wherein the first switches and the second switches are operated complementary such that when the first switches are on, the second switches are off and when the second switches are on, the first switches are off; and for each load zone, a bus capacitor connected in parallel with the load zone; wherein each pair of switches is electrically connected to each other pair of switches providing an electrical path for each bus capacitor to discharge current to each other bus capacitor when a voltage across a bus capacitor is greater than a voltage across another bus capacitor.

These and other implementations can each optionally include one or more of the following features. Some aspects include a controller configured to repeatedly turn the first and second switches on and off according to a specified duty cycle.

In some aspects, each switch includes a metal-oxide-semiconductor field-effect transistor. The power balancer can include an individual voltage regulator for each load zone. The individual voltage regulator for each load zone is connected between the bus capacitor for the load zone and an input power connection to the load zone.

In general, another aspect of the subject matter described in this specification can be embodied in circuits that include load zones that are powered in series, each load zone being fabricated on a common integrated circuit; and a power balancer for balancing a voltage across each load zone, the power balancer including: an AC transformer array that includes, for each load zone, an AC transformer; and for each load zone: a pair of switches that includes a first switch and a second switch, wherein the first switches and the second switches are operated complementary such that when the first switches are on, the second switches are off and when the second switches are on, the first switches are off; and a bus capacitor connected in parallel with the load zone; wherein each AC transformer is electrically connected to each AC transformer providing an electrical path for each bus capacitor to discharge current to each other bus capacitor when a voltage across a bus capacitor is greater than a voltage across another bus capacitor.

These and other implementations can each optionally include one or more of the following features. Some aspects include a controller configured to repeatedly turn the first and second switches on and off according to a specified duty cycle.

In some aspects, each switch includes a metal-oxide-semiconductor field-effect transistor. The power balancer can include an individual voltage regulator for each load zone. The individual voltage regulator for each load zone can be connected between the bus capacitor for the load zone and an input power connection to the load zone.

The subject matter described in this specification can be implemented in particular embodiments so as to realize one or more of the following advantages. Power balancer circuits described herein allow for powering multiple load zones of an integrated circuit (IC), such as an ASIC, in series. Dividing the loads of an IC into multiple load zones and powering the load zones in series allows for the loads of the IC as a whole to operate at a higher voltage and lower current, e.g., N times higher voltage and 1/N of the original current where N is the number of divided load zones. For example, if a 0.8V, 1000 A ASIC die is divided into four load zones, e.g., four cores, the total voltage becomes 3.2V and the current is reduced to 250 A if the four load zones are powered in series. In such a case, the DC/DC power conversion will only require a 3.2V output instead of a 0.8V output, which can lead to an efficiency improvement of 5% or more due to, for example, fewer phases of power conversion stages than parallel power connections. In addition, the power delivery IR drop loss can be effectively reduced by 70-80% or more relative to parallel power connections, which amounts to an efficiency improvement of about 7-8% or more, due to the reduced current that routed from the voltage regulator to the IC. The reduced current can also enable the voltage regulator to be located a greater distance from the IC.

The power balancer circuits only process differential current that circulates among the load zones, e.g., cores, such that, in normal operation when load zone currents are close in value to each other, the power balancer only dissipates very low power. The load zone to load zone series connection can be implemented in the IC package so that the BGA balls do not carry high current, which addresses the EM limits of the BGAs.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein relate to power balancer circuits that enable multiple load zones of an IC to be powered in series while maintaining balanced voltage at each load zone. Each load zone is a group of one or more electrical loads fabricated on a chip and that are powered as a group using a common power source. An example load zone is a processor core. For example, the cores of a multicore processor can be powered in series using the power balancers described in this document. As the cores (or other load zones) can require different amounts of current, the power balancer is used to maintain the same voltage level at each load zone. In some implementations, the power balancer includes an individual voltage regulator for each load zone. Each individual voltage regulator further regulates the operating voltage of its load zone.

Figure 1:
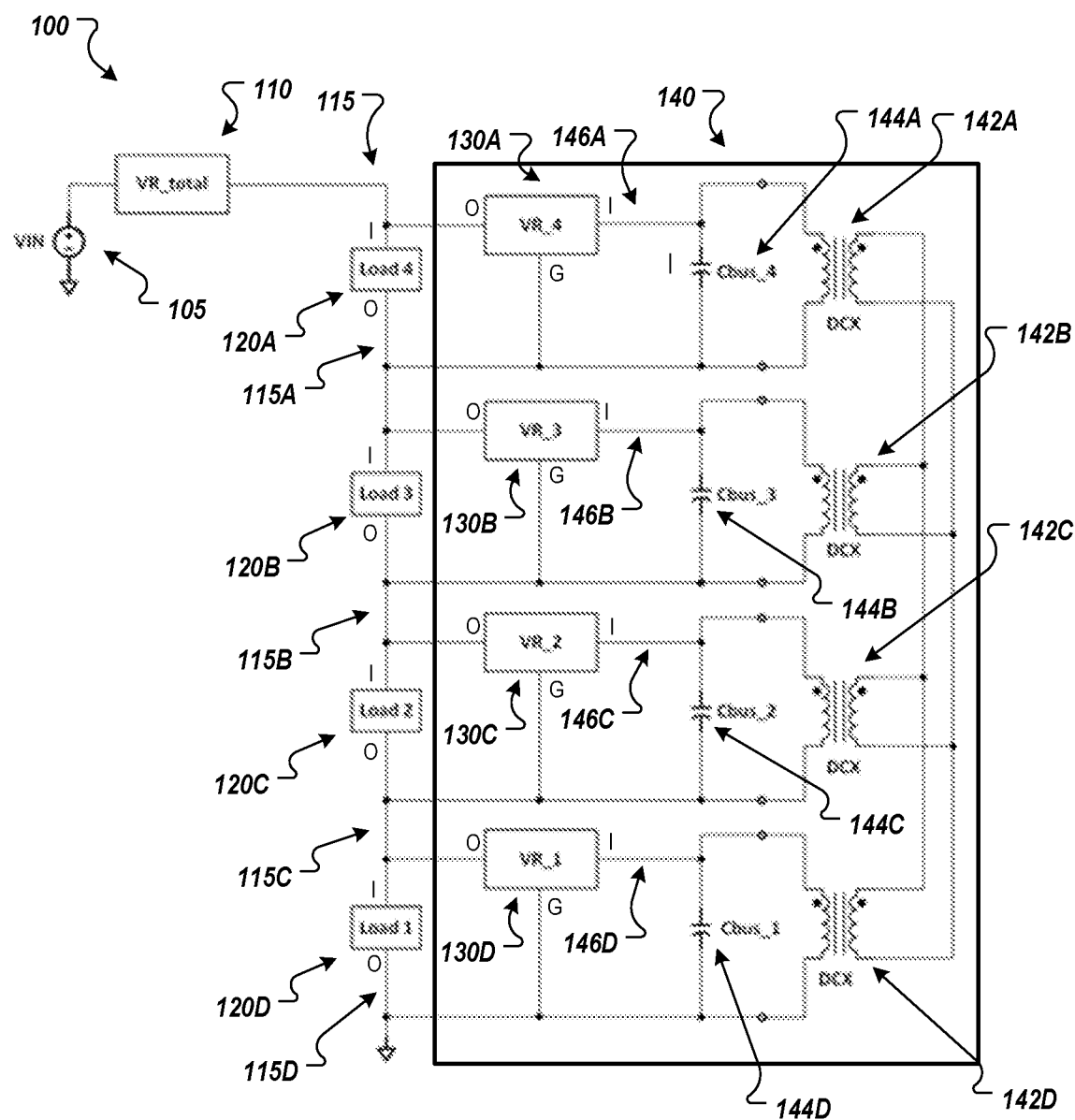
FIG. 1 is a diagram of a circuit that includes multiple loads powered in series and an example power balancer.

FIG. 1 is a diagram of a circuit 100 that includes multiple loads 120A-120D powered in series and an example power balancer 140. Each load 120A-120D can represent an individual load zone that has one or more electrical loads. The loads 120A-120D can be implemented on the same IC, e.g., the same ASIC, the same chip die, or the same system board. For example, each load 120A-120D can be a processor core of a multi-core processor IC. In another example, each load 120A-120D can include multiple electrical circuits. The electrical circuits can be arranged in the loads 120A-120D such that each load 120A-120D draws approximately the same amount of current in operation, e.g., within a threshold amount of current. In some implementations, the loads 120A-120D are unbalanced in that one or more of loads 120A-120D draws a different amount of current (e.g., more than a threshold amount more current) than one or more of the other loads 120A-120D. Although there are four loads 120A-120D, there can be other numbers of loads, e.g., three, six, ten, etc. In another example, the loads 120A-120D can include multiple cores on the same chip die or multiple processors on the same system board.

As shown in FIG. 1, the loads 120A-120D are powered in series by a power source 105 and a voltage regulator 110. The power source 105 can be a direct current (DC) power supply that provides power to a motherboard, or other circuit board, on which the IC with the loads 120A-120D is installed. For example, the power source 105 can be a 12 VDC power source that provides DC power to one or more ICs and/or other components installed on the circuit board.

The voltage regulator 110 can be an off-chip voltage regulator that is installed on the circuit board rather than being implemented in the IC. The voltage regulator 110 provides the total net power to the loads 120A-120D via a main power bus 115 that connects the loads 120A-120D in series. The voltage regulator 110 can convert the voltage of the power source 105 to a particular voltage for the loads 120A-120D. For example, the voltage regulator 110 can convert an input voltage of 12 VDC from the power source 105 to a constant 3.2 VDC for the loads 120A-120D.

In some implementations, the voltage regulator 110 operates using closed-loop control to maintain a particular voltage level across the bus capacitors 144A-144D (described below). A voltage sensor can be used to measure (e.g., periodically or continuously) the voltage across one of the bus capacitors 144A-144D, e.g., across the bus. The voltage regulator 110 can receive the voltage measurements and adjust its output voltage or current if needed. For example, if the voltage across the bus capacitor 144D is higher than the particular voltage level, the voltage regulator 110 can reduce its output voltage or current to reduce the voltage across the bus capacitor 144D and, in turn, the voltage across each other bus capacitor 144A-144C.

The main power bus 115 can be implemented using conductive traces of the IC, ASIC, processor unit, or circuit board that includes the loads 120A-120D. For example, the main power bus 115 can be implemented on the IC, the circuit board, or both. For example, conductive traces of the circuit board can connect the output of the voltage regulator 110 to pins of an IC. The conductive traces of the main power bus 115 can connect the pins of the IC to the load 120A. The main power bus 115 includes load-to-load series power connections 115A-115C. These power connections 115A-115C can also be implemented using conductive traces of the IC. For example, the power connection 115A can include a conductive trace that connects output power of the load 120A to input power of the load 120B; the power connection 115B can include a conductive trace that connects output power of the load 120B to input power of the load 120C; and the power connection 115C can include a conductive trace that connects output power of the load 120C to input power of the load 120D. Another connection 115D can connect the output power of the load 120D to ground of the circuit board, e.g., via a pin of the IC and a conductive trace of the circuit board.

Figure 2A:
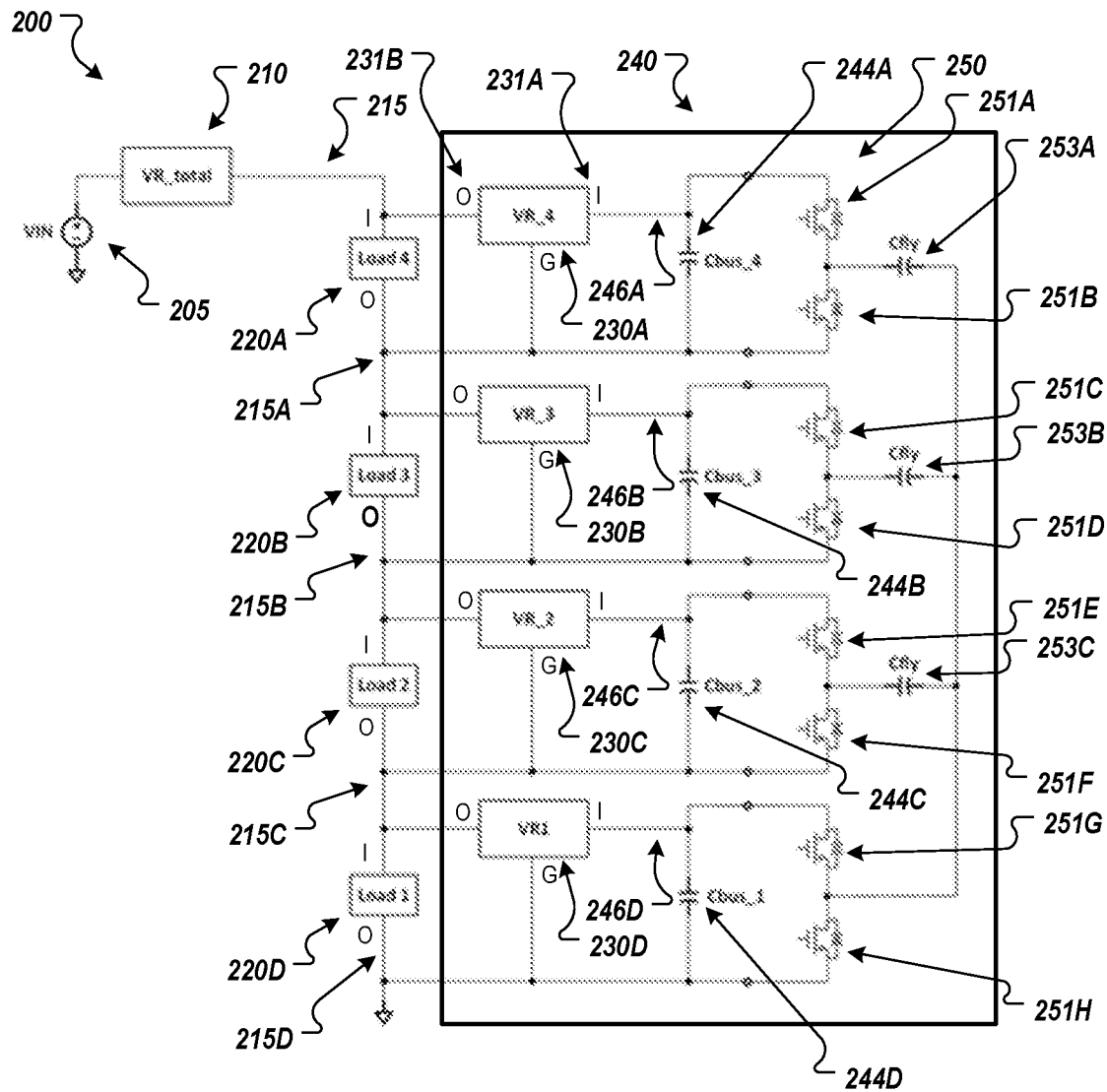
FIG. 2A is a diagram of another circuit that includes multiple loads powered in series and an example power balancer.
Figure 4:
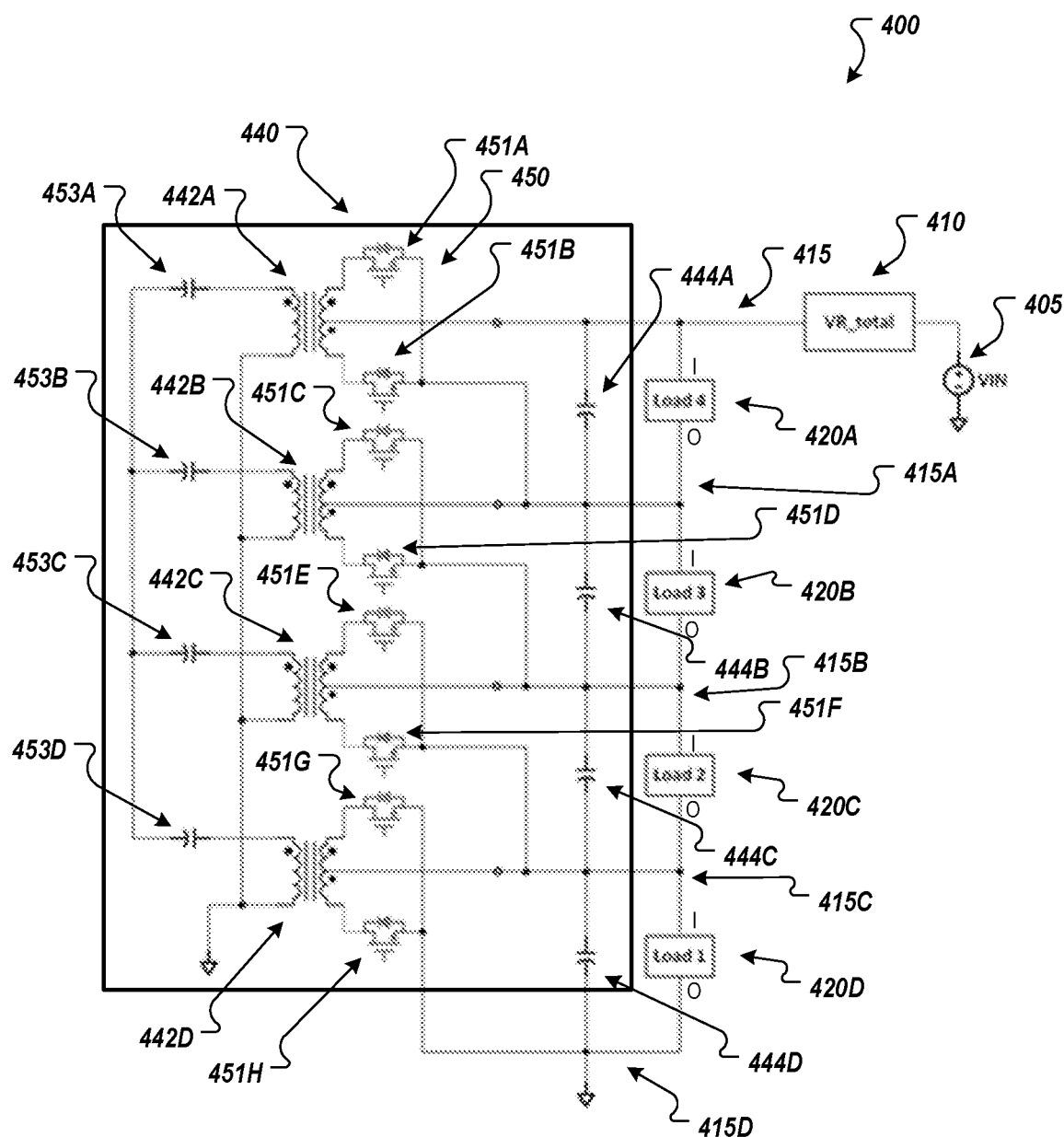
FIG. 4 is a diagram of another circuit that includes multiple loads powered in series and an example power balancer.

The power balancer 140 includes an equivalent DC transformer array that includes an equivalent DC transformer 142A-142D for each load 120A-120D, respectively. An equivalent DC transformer is an electrical circuit model that represents power converters that are capable of achieving fixed-ratio DC-DC conversion. A fixed-ratio DC-DC converter is a converter for which the output voltage is a fixed ratio of the input voltage. The fixed-ratio DC-DC converters can be implemented by switched capacitor based converter topologies as shown in FIG. 2A, by AC transformer-based converter topologies, as shown in FIG. 4, or other appropriate bidirectional fixed conversion ratio converter topology. The power balancer 140 also includes, for each load 120A-120D, a respective bus capacitor 144A-144D.

In general, the equivalent DC transformer array provides inter-port differential power freewheeling to provide the same voltage (or similar voltage within a threshold amount) across each bus capacitor 144A-144D. When the voltage across one of the bus capacitor, e.g., bus capacitor 144A, is greater than the voltage across the other bus capacitors, 144B-144D, the bus capacitor 144A can discharge through the equivalent DC transformer 142A and charge the other capacitors 144B-144D. In this way, the equivalent DC transformer array provides the same (or similar) input voltage on the input bus 146A-146D for each load 120A-120D. This is described in more detail below with reference to FIG. 2A.

In this example, the power balancer 140 also includes an individual voltage regulator 130A-130D for each load 120A-120D. The input of each voltage regulator 130A-130D is connected to a respective bus capacitor 144A-144D. Thus, the input voltage for each voltage regulator 130A-130D is the same (or similar within a threshold amount) due to the transformer array. That is, the bus capacitors 144A-144D provide the same or similar input voltage to the voltage regulators 130A-130D due to the power freewheeling of the power balancer 140.

Each voltage regulator 130A-130D can fine tune the voltage level for its respective load 120A-120D, e.g., for implementations in which tighter voltage regulation is required or preferred. As described in more detail below, if the loads 120A-120D are unbalanced, the voltage regulators 130A-130D can provide or pull current from the main power bus 115 that connects the loads 120A-120D in series. The output of each voltage regulator 130A-130D is connected to the input of its load 120A-120D. The ground of each voltage regulator 130A-130D is connected to the output power of its load 120A-120D such that the ground of the load and the voltage regulator is the same.

In some implementations, the components of the power balancer 140 are implemented on-chip with the loads 120A-120D, e.g., on a same IC as the loads 120A-120D. In some implementations, some components of the power balancer 140 can be implemented off-chip, e.g., on a circuit board that includes the IC with the loads 120A-120D. For example, the equivalent DC transformers 142A-142D and/or the voltage regulators 130A-130D can be implemented off-chip.

FIG. 2A is a diagram of another circuit 200 that includes multiple loads 220A-220D powered in series and an example power balancer 240. The circuit 200 is similar to the circuit 100 and includes many of the same components as the circuit 100. For example, the circuit 200 includes a power source 205, a voltage regulator 210, multiple loads 220A-220D, a main power bus 215, and connections 215A-215D, which can be the same as (or similar to), and operate in the same (or a similar) way as, the power source 105, the voltage regulator 110, the loads 120A-120D, the main power bus 115, and the connections 115A-115D, respectively, of the circuit 100 of FIG. 1. The loads 220A-220D can be implemented on an IC, e.g., an ASIC, on a processor unit, on a circuit board, e.g., a system board, or motherboard, etc.

The circuit 200 is an example of a switched capacitor based converter topology for implementing the DC fixed ratio converter. The circuit 200 also includes a power balancer 240. The power balancer 240 is similar to the power balancer 140 of FIG. 1. For example, the power balancer 240 includes an individual voltage regulator 230A-230D for each load 220A-220D and a bus capacitor 244A-244D for each voltage regulator 230A-230D. In the power balancer 240, the equivalent DC transformers are implemented using a switched capacitor circuit 250. That is, the equivalent DC transformers are implemented without using actual transformers, as shown in FIG. 2A.

The switched capacitor circuit 250 includes a pair of switches for each bus capacitor 244A-244D and thus, for each load 220A-220D. For example, the switched capacitor circuit 250 includes a first switch 251A and a second switch 251B for the load 220A, a first switch 251C and a second switch 251D for the load 220B, a first switch 251E and a second switch 251F for the load 220C, and a first switch 251G and a second switch 251H for the load 220D. Each switch can be implemented as a transistor, e.g., as a metal-oxide-semiconductor field-effect transistor (MOSFET) as shown in FIG. 2A.

A connection point between each pair of switches 251A-251H is connected to each other connection point via flying capacitors 253A-253C. For example, the connection point between switches 251A and 251B is connected to a flying capacitor 253A; the connection point between switches 251C and 251D is connected to a flying capacitor 253B; and the connection point between switches 251E and 251F is connected to a flying capacitor 253C. The other end of each flying capacitor 253A-253C is connected to each other and to the connection point between the switches 251G and 251H. Each connection point can be an electrical connection to the appropriate terminal of each MOSFET in the pair of switches, e.g., to the source of the first switch and the drain of the second switch. The flying capacitors perform DC voltage blocking and voltage level shifting for the switch capacitor circuit 250.

In operation, the switches 253A-253H are switched on and off to force the voltage across each bus capacitor 244A-244D to be the same or similar (e.g., within a threshold amount). This, in turn, ensures that the input voltage on the input bus 246A-246D for each load 220A-220D is the same or similar (e.g., within a threshold amount).

The first switch and second switch for each load 220A-220D can be complementary such that, when one of the two switches is on, the other switch is off. For example, if the first switch 251A is on, the second switch 251B will be off. The first switches 251A, 251C, 251E, and 251G for all of the loads 220A-220D can be operated the same. That is, all of the first switches 251A, 251C, 251E, and 251G can be turned on at the same time and off at the same time. Similarly, the second switches 251B, 251D, 251F, and 251H for all of the loads 220A-220D can be operated the same. That is, all of the second switches 251B, 251D, 251F, and 251H can be turned on at the same time and off at the same time. Thus, at any given point in time either all of the first switches are on and all of the second switches are off, or all of the first switches are off and all of the second switches are on, except during the brief time that the switches are switching states.

A controller (not shown) can control the switches such that the switches are switched on and off according to a specified duty cycle. For example, the controller can be connected to the date of each MOSFET to turn the MOSFET on and off by controlling the current to the gate. In some implementations, the duty cycle is 50% such that the first switches are on the same amount of time the second switches are on. For example, the controller can repeatedly turn the first switches on and the second switches off for 5 milliseconds (ms), then turn the second switches on and the first switches off for 5 ms. Other appropriate time periods, e.g., 0.5 ms, 10 ms, etc.) can also be used. In other implementations, the duty cycle can be different such that the first switches are on for a different amount of time than the second switches.

This switching of the first and second switches allows the bus capacitors 244A-244D to charge and discharge each other if the voltage across one of the bus capacitors 244A-244D is different from the voltage across one or more other bus capacitors 244A-244D. For example, if the voltage across the bus capacitor 244A is greater than the voltage across the other bus capacitors 244B-244D, the switching of the switches 251A-251H in this manner allows the bus capacitor 244A to discharge some of its energy to the other bus capacitors 244B-244D during each cycle of switching. Over time, e.g., after multiple cycles of switching the switches on and off, the voltage across the bus capacitors 244B-244D become the same or close to the same (e.g., within a threshold amount of each other).

The individual voltage regulators 230A-230D for each load 220A-220D can then fine tune the voltage for the loads. For example the voltage regulator 210 can use closed loop control based on voltage measurements across one of the bus capacitors, e.g., bus capacitor 244D, to maintain the voltage level for that bus capacitor 244D at a particular voltage level. The switched capacitor circuit 250 ensures that the voltage across each other bus capacitor 244A-244C is the same or similar to the bus capacitor 244D by balancing the voltages across all bus capacitors 244A-244D. Each voltage regulator 230A-230D can then fine tune the voltage on its input bus 246A-246D, respectively, to the appropriate voltage for the load 220A-220D. In this way, the voltage across each load 220A-220D is fined tune to the same or similar voltage level.

When the loads 220A-220D are balanced, e.g., draw the same amount of current, the voltage regulators 230A-230D carry little or no current with very little power consumption. However, if the loads 220A-220D are unbalanced, one or more voltage regulators 230A-230D may deliver current to its portion of the power bus 215 and one or more voltage regulators 230A-230D may absorb some current from its portions of the power bus 215 as the total current along the power bus 215 will be the same due to the series connection. For example, if the load 220A carries 115 amps, the load 220B carries 105 amps, the load 220C carries 95 A, and the load 220D carries 85 amps, the voltage regulator 230A will absorb 15 amps, the voltage regulator 230B will absorb 5 amps, the voltage regulator 230C will deliver 5 amps, and the voltage regulator 230D will deliver 15 amps such that the current at each point on the main power bus 115 is 100 amps. Even in this unbalanced example, the voltage regulators 230A-230D only handle the differential power of the loads 220A-220D, resulting in higher system efficiency.

Figure 2B:
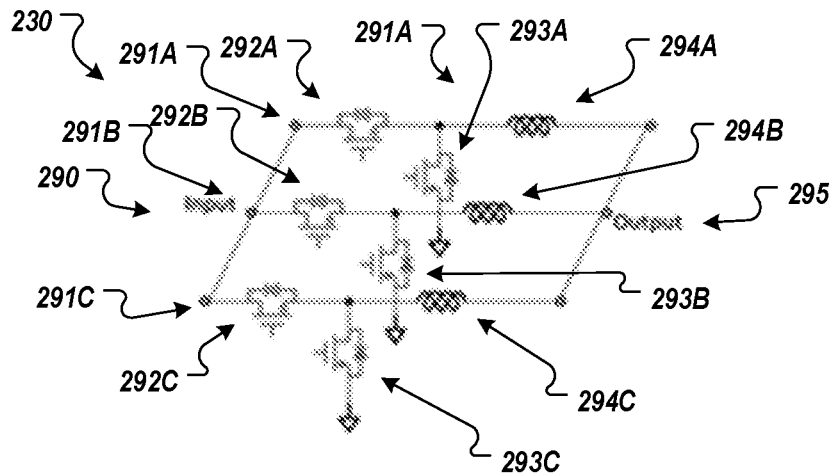
FIG. 2B is a circuit diagram of an example voltage regulator.

FIG. 2B is a circuit diagram of an example voltage regulator 230. Each voltage regulator 230A-230B can be implemented using the voltage regulator 230. The voltage regulators 130A-130D of FIG. 1 can also be implemented using the voltage regulator 230.

The voltage regulator 230 is a multiphase buck voltage regulator. The multiphase buck voltage regulator 230 includes an input 290 and an output 295. For the voltage regulator 230A, the input 290 can be located at the input 231A connected to the bus capacitor 244A and the output 295 can be located at the output 231B connected to the load 220A.

In this example, the multiphase buck converter 230 includes three "phases" in the form of three parallel buck converters 291A-291C. Each buck converter 291A-291C includes a first MOSFET switch 292A-292C, a second MOSFET switch 293A-293C, and an inductor 294A-294C. For example, the buck converter 291A includes a first MOSFET switch 292A, a second MOSFET switch 293A, and an inductor 294A.

For each buck converter, e.g., the buck converter 291A, the two MOSFET switches 292A and 293A are used to control the current in the inductor 294A of the buck converter 291A, which in turn controls the output voltage across the load. To control the output voltage across the load, the first MOSFET switch 292A-292C is switched on and off at a particular frequency. When the MOSFET switch 292A is on, the MOSFET switch 293A is off and vice versa. To increase the output voltage, the period of time that the first switch 292A-292C is on can be increased relative to the period of time that the corresponding second switch 293A-293C is on. Similarly, to reduce the output voltage, the period of time that the first switch 292A-292C is on can be reduced relative to the period of time that the corresponding second switch 293A-293C is on.

The multiphase buck converter 230 includes multiple buck converters 291A-291C to enable the multiphase buck converter 230 to be able to produce a target amount of output current. For example, each buck converter 291A-291C can produce up to a particular amount of current. The total output current of the multiphase buck converter 230 is the sum of the current output by each individual buck converter 291A-291C. If more output current is required, the multiphase buck converter 230 can be designed with more buck converters 291A-291C.

Figure 3:
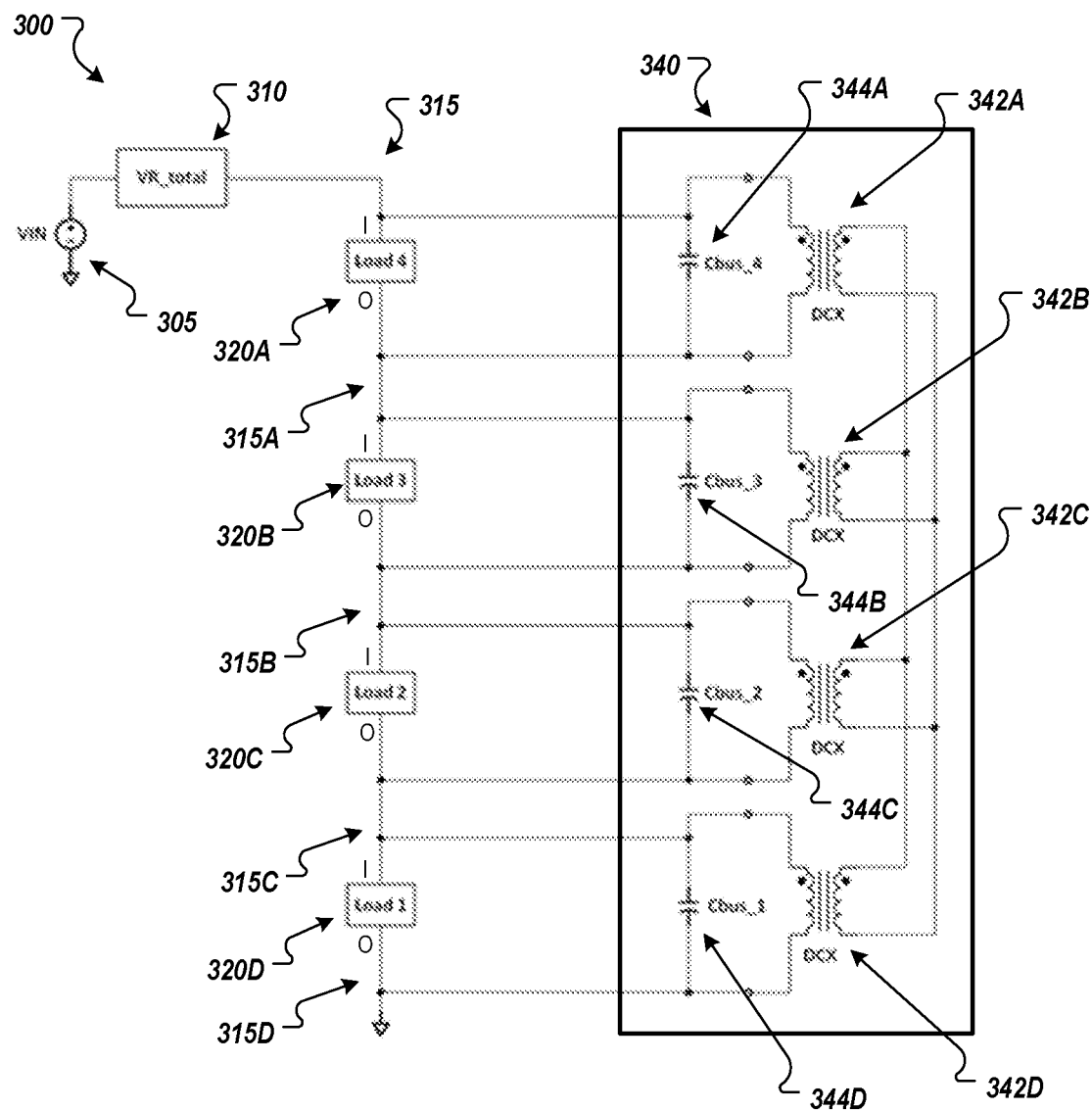
FIG. 3 is a diagram of another circuit that includes multiple loads powered in series and an example power balancer.

FIG. 3 is a diagram of another circuit 300 that includes multiple loads 320A-320D powered in series and an example power balancer 340. The circuit 300 is similar to the circuit 100 and includes many of the same components as the circuit 100. For example, the circuit 300 includes a power source 305, a voltage regulator 310, multiple loads 320A-320D, a main power bus 315, and connections 315A-315D, which can be the same as (or similar to), and operate in the same (or a similar) way as, the power source 105, the voltage regulator 110, the loads 120A-120D, the main power bus 115, and the connections 115A-115D, respectively, of the circuit 100 of FIG. 1.

The circuit 300 also includes a power balancer 340 that includes an equivalent DC transformer array of equivalent DC transformers 342A-342D and bus capacitors 344A-

344D, similar to the power balancer 140 of FIG. 1. As described above, an equivalent DC transformer is an electrical circuit model that represents power converters that are capable of achieving fixed-ratio DC-DC conversion. In this example, the power balancer 340 does not include individual voltage regulators for each load 320A-320D. Instead, the bus capacitors 344A-344D directly control the voltage of the loads 320A-320D. For example, the bus capacitor 344A is in parallel with the load 320A and controls the voltage across the load 320A. This power balancer 340 can be used when tight voltage regulation is not required for the loads 320A-320D.

The equivalent DC transformer array can be implemented using a switched capacitor circuit that is the same as, or similar to, the switched capacitor circuit 250 of FIG. 2A. In another example, the equivalent DC transformer array can be implemented using an AC transformer based topology, as shown in FIG. 4. The equivalent DC transformer array can force the voltage across each bus capacitor 344A-344D to be the same or similar, as described above. For example, if the equivalent DC transformer array is implemented as a switched capacitor circuit, a controller can turn the switches on and off based on a duty cycle so that the bus capacitors 344A-344D having a higher voltage than the others can discharge current into the others. The power balancer 340 can be implemented on-chip with the loads 320A-320D or on a circuit board on which the IC with the loads 320A-320D is mounted.

FIG. 4 is a diagram of another circuit 400 that includes multiple loads 420A-420D powered in series and an example power balancer 440. The circuit 400 is similar to the circuit 100 and includes many of the same components as the circuit 100. For example, the circuit 400 includes a power source 405, a voltage regulator 410, multiple loads 420A-420D, a main power bus 415, and connections 415A-415D, which can be the same as (or similar to), and operate in the same (or a similar) way as, the power source 105, the voltage regulator 110, the loads 120A-120D, the main power bus 115, and the connections 115A-115D, respectively, of the circuit 100 of FIG. 1. The loads 420A-420D can be implemented on an IC.

The circuit 400 is an example of an AC transformer based converter topology and is an example implementation of the circuit 300 of FIG. 3. The circuit 400 also includes a power balancer 440 with a modified LLC resonant converter circuit 450. The modified LLC resonant converter circuit 450 includes a pair of switches 451A-451H (e.g., MOSFET switches) for each load 420A-420D. The power balancer 440 also includes an AC transformer 442A-442D and capacitor 453A-453D for each load 420A-420D. The transformers 442A-442D can be high-frequency AC transformers, e.g., implemented as the LLC resonant converter transformer with its leakage inductance for the resonant operation.

A first winding (on the right side) of the transformer 442A-442D for each load 420A-420D is connected between the pair of switches 451A-451H for the load 442A-442D. For example, one winding of the transformer 442A is connected between the switches 451A and 451B for the load 420A. The center tap of this winding is connected to the input power side of the load. For example, the center tap of the transformer 442A is connected to the input power side of the load 420A.

A second winding (on the left side) of each transformer 442A-442D is connected to the second winding of each other transformer 442A-442D using the capacitors 453A-453D. For example, one side of the second winding of the transformer 442A is connected to the capacitor 453A. The other side of the capacitor 453A is connected to the corresponding side of the capacitor 453B-453D for each other transformer 442B-442D. The other side of the second winding of the transformer 442A is connected directly (e.g., without a capacitor or other intervening component) to the other side of the second winding of each other transformer 442B-442D.

These transformers 442A-442D along with the capacitors 453A-453D can step up or step down the voltage to each load 420A-420D. An advantage of using this transformer-based topology compared to using a switched capacitor circuit is higher efficiency under the condition of having low voltage and high current output.

To balance the voltages across the loads 420A-420D, the switches 451A-451H can be switched on and off by a controller, similar to the switches 251A-251G of FIG. 2. That is, the first switch and second switch for each load 420A-420D can be complementary such that when one of the two switches is on the other switch is off. For example, if the first switch 451A is on, the second switch 451B will be off. The first switches 451A, 451C, 451E, and 451G for all of the loads 420A-420D can be operated the same. That is, all of the first switches 451A, 451C, 451E, and 451G can be turned on at the same time and off at the same time. Similarly, the second switches 451B, 451D, 451F, and 451H for all of the loads 420A-420D can be operated the same. That is, all of the second switches 451B, 451D, 451F, and 451H can be turned on at the same time and off at the same time. Thus, at any given point in time either all of the first switches are on and all of the second switches are off, or all of the first switches are off and all of the second switches are on, except during the brief time that the switches are switching states.

A controller (not shown) can control the switches such that the switches are switched on and off according to a specified duty cycle. For example, the controller can be connected to the gate of each MOSFET to turn the MOSFET on and off by controlling the current to the gate. In some implementations, the duty cycle is 50% such that the first switches are on the same amount of time the second switches are on. For example, the controller can repeatedly turn the first switches on and the second switches off for 5 microseconds (µs), then turn the second switches on and the first switches off for 5 ms. Other appropriate time periods, e.g., 0.5 ms, 10 ms, etc.) can also be used. In other implementations, the duty cycle can be different such that the first switches are on for a different amount of time than the second switches.

This switching of the first and second switches allows the bus capacitors 444A-444D to charge and discharge each other if the voltage across one of the bus capacitors 444A-444D is different from the voltage across one or more other bus capacitors 444A-444D. For example, if the voltage across the bus capacitor 444A is greater than the voltage across the other bus capacitors 444B-444D, the switching of the switches 451A-451H in this manner allows the bus capacitor 444A to discharge some of its energy to the other bus capacitors 444B-444D during each cycle of switching. Over time, e.g., after multiple cycles of switching the switches on and off, the voltage across the bus capacitors 444B-444D become the same or close to the same (e.g., within a threshold amount of each other).

Although not show, the power balancer 440 can also include an individual voltage regulator for each load 440A-440D, similar to the voltage regulators 230A-230D of FIG. 2A. For example, a voltage regulator can be connected between the top terminal of the bus capacitor 444A and the input to the load 420A, similar to the arrangement of the voltage regulator 230A of FIG. 2A. This can provide tighter voltage regulation for the loads 420A-420D, as described above.

Figure 5:
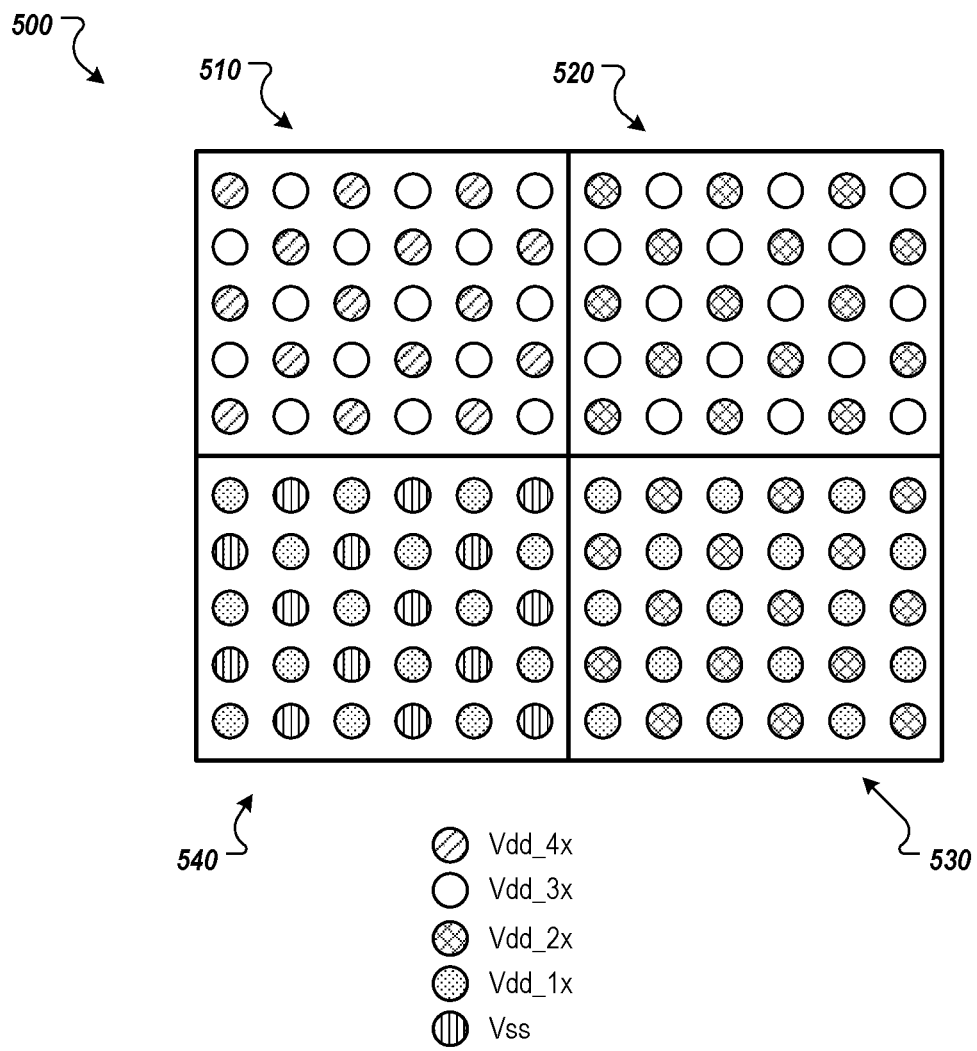
FIG. 5 is a block diagram of pin map for an IC.

FIG. 5 is a block diagram of pin map 500 for an IC. The pin map 500 shows the layout of pins on the bottom of the IC that is or will be connected to a motherboard or other PCB. The pin map 500 is for implementations in which the power balancer and, if included, the individual voltage regulator for each load zone is off-chip. In such cases, the power to the loads is provided to the pins of the pin map 500, e.g., using conductive traces of the PCB between the power source and the IC. Conductive traces of the IC then route the power from the pins to the load zones. For example, the power balancer and the individual voltage regulators can be installed on a motherboard (or other PCB) that includes the IC and conductive traces of the PCB can route the power from the power balancer or voltage regulators to the pins of the IC included in the pin map 500.

The pin map 500 includes four regions 510, 520, 530, and 540. Each region includes multiple pairs of input power pins for the load zones of the IC. Each region can be for a particular load zone. Using the circuit 200 as an example, the region 510 can include pins that receive power for the load 220A; the region 520 can include pins that receive power for the load 220B; the region 530 can include pins that receive power for the load 220C; and the region 540 can include pins that receive power for the load 220D.

Although the circuit 200 of FIG. 2A is used as an example for the pin map 500, the same of similar pin arrangements and connections can be used for the other circuits 100, 300, and 400 described above. However, if the circuit does not include individual voltage regulators for each load zone, such as the circuit 300, the pins can connect the load zones to the appropriate buses of the power balancer.

The region 510 includes multiple pairs of Vdd_4x and Vdd_3x pins. In the region 510, the Vdd_4x pins are for positive supply voltage to the load 220A and the Vdd_3x pins are for negative supply or ground for the load 220A. The Vdd_4x pins can be connected to the input of the load 220A and the pins Vdd_3x can be connected to the output of the load 220A. For example, one or more of the Vdd_4x pins can be connected to the output of the voltage regulator 230A via a respective trace of the PCB. Each Vdd_4x pin can be connected to the input of the load 220A via a respective internal trace of the IC.

Similarly, one or more of the Vdd_3x pins in the region 510 can be connected to the ground of the voltage regulator 230A via a respective trace of the PCB. Each Vdd_3x pin in the region 510 can also be connected to the output of the load 220A via a respective internal trace of the IC. As each pair of pins (one Vdd_4x pin and one Vdd_3x pin) may only be capable of handling a limited amount of current, the voltage regulator 230A can be connected to multiple pairs of pins to provide sufficient current to the load 230A. For example, the output of each individual buck converter of the voltage regulator 230A can be connect to a respective pair of Vdd_4x and Vdd_3x pins.

The region 520 includes multiple pairs of Vdd_3x and Vdd_2x pins. In the region 520, the Vdd_3x pins are for positive supply voltage to the load 220B and the Vdd_2x pins are for negative supply or ground for the load 220B. The Vdd_3x pins in the region 520 can be connected to the input of the load 220B and the Vdd_2x pins in the region 520 can be connected to the output of the load 220B. For example, one or more of the Vdd_3x pins in the region 520 can be connected to the output of the voltage regulator 230B via a respective trace of the PCB. Each Vdd_3x pin can be connected to the input of the load 220B via a respective internal trace of the IC.

Similarly, one or more of the Vdd_2x pins in the region 520 can be connected to the ground of the voltage regulator 230B via a respective trace of the PCB. Each Vdd_2x pin in the region 520 can also be connected to the output of the load 220B via a respective internal trace of the IC. As each pair of pins (one Vdd_3x pin and one Vdd_2x pin) may only be capable of handling a limited amount of current, the voltage regulator 230B can be connected to multiple pairs of pins to provide sufficient current to the load 230B. For example, the output of each individual buck converter of the voltage regulator 230B can be connect to a respective pair of Vdd_3x and Vdd_2x pins.

The region 530 includes multiple pairs of Vdd_2x and Vdd_1x pins. In the region 530, the Vdd_2x pins are for positive supply voltage to the load 220C and the Vdd_1x pins are for negative supply or ground for the load 220C. The Vdd_2x pins in the region 530 can be connected to the input of the load 220C and the Vdd_1x pins in the region 530 can be connected to the output of the load 220C. For example, one or more of the Vdd_2x pins in the region 530 can be connected to the output of the voltage regulator 230C via a respective trace of the PCB. Each Vdd_2x pin can be connected to the input of the load 220C via a respective internal trace of the IC.

Similarly, one or more of the Vdd_1x pins in the region 530 can be connected to the ground of the voltage regulator 230C via a respective trace of the PCB. Each Vdd_1x pin in the region 530 can also be connected to the output of the load 220C via a respective internal trace of the IC. As each pair of pins (one Vdd_2x pin and one Vdd_1x pin) may only be capable of handling a limited amount of current, the voltage regulator 230C can be connected to multiple pairs of pins to provide sufficient current to the load 230C. For example, the output of each individual buck converter of the voltage regulator 230C can be connect to a respective pair of Vdd_2x and Vdd_1x pins.

The region 540 includes multiple pairs of Vdd_1x and Vss pins. In the region 540, the Vdd_1x pins are for positive supply voltage to the load 220C and the Vss pins are for negative supply or ground for the load 220D. The Vdd_1x pins in the region 540 can be connected to the input of the load 220D and the Vss pins in the region 540 can be connected to the output of the load 220D. For example, one or more of the Vdd_1x pins in the region 540 can be connected to the output of the voltage regulator 230D via a respective trace of the PCB. Each Vdd_1x pin can be connected to the input of the load 220D via a respective internal trace of the IC.

Similarly, one or more of the Vss pins in the region 540 can be connected to the ground of the voltage regulator 230D via a respective trace of the PCB. Each Vss pin in the region 530 can also be connected to the output of the load 220D via a respective internal trace of the IC. As each pair of pins (one Vdd_1x pin and one Vss pin) may only be capable of handling a limited amount of current, the voltage regulator 230D can be connected to multiple pairs of pins to provide sufficient current to the load 230D. For example, the output of each individual buck converter of the voltage regulator 230D can be connect to a respective pair of Vdd_1x and Vss pins.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A circuit, comprising:
a plurality of load zones that are powered in series, each load zone being fabricated on a common integrated circuit; and
a power balancer for balancing a voltage across each load zone, the power balancer including:
an equivalent DC transformer array that includes, for each load zone, an equivalent DC transformer connected in parallel with the load zone; and
for each load zone, a bus capacitor connected in parallel with the load zone;
wherein each equivalent DC transformer is electrically connected to each other equivalent DC transformer providing an electrical path for each bus capacitor to discharge current to each other bus capacitor when a voltage across a bus capacitor is greater than a voltage across another bus capacitor.

2. The circuit of claim 1, wherein:
each equivalent DC transformer comprises a switched capacitor circuit that includes a pair of switches that includes a first switch and a second switch; and
the first switch and the second switch are operated complementary such that when the first switches are on, the second switches are off and when the second switches are on, the first switches are off.

3. The circuit of claim 2, further comprising a controller configured to repeatedly turn the first and second switches on and off according to a specified duty cycle.

4. The circuit of claim 2, wherein each switch comprises a metal-oxide-semiconductor field-effect transistor.

5. The circuit of claim 2, wherein:
the power balancer comprises a transformer for each load zone; and
the transformer for each load zone is connected between the first switch for the load zone and the second switch for the load zone.

6. The circuit of claim 1, wherein the power balancer is fabricated on the integrated circuit.

7. The circuit of claim 1, wherein the power balancer is mounted on a circuit board with the integrated circuit.

8. The circuit of claim 1, wherein the power balancer includes an individual voltage regulator for each load zone.

9. The circuit of claim 8, wherein the individual voltage regulator for each load zone is connected between the bus capacitor for the load zone and an input power connection to the load zone.

10. The circuit of claim 1, wherein each load zone is a processor core.

11. A circuit, comprising:
a plurality of load zones that are powered in series, each load zone being fabricated on a common integrated circuit; and
a power balancer for balancing a voltage across each load zone, the power balancer including:
a switched capacitor circuit that includes, for each load zone, a pair of switches that includes a first switch and a second switch, wherein the first switches and the second switches are operated complementary such that when the first switches are on, the second switches are off and when the second switches are on, the first switches are off; and
for each load zone, a bus capacitor connected in parallel with the load zone;
wherein each pair of switches is electrically connected to each other pair of switches providing an electrical path for each bus capacitor to discharge current to each other bus capacitor when a voltage across a bus capacitor is greater than a voltage across another bus capacitor.

12. The circuit of claim 11, further comprising a controller configured to repeatedly turn the first and second switches on and off according to a specified duty cycle.

13. The circuit of claim 11, wherein each switch comprises a metal-oxide-semiconductor field-effect transistor.

14. The circuit of claim 11, wherein the power balancer includes an individual voltage regulator for each load zone.

15. The circuit of claim 14, wherein the individual voltage regulator for each load zone is connected between the bus capacitor for the load zone and an input power connection to the load zone.

16. A circuit, comprising:
a plurality of load zones that are powered in series, each load zone being fabricated on a common integrated circuit; and
a power balancer for balancing a voltage across each load zone, the power balancer including:
an AC transformer array that includes, for each load zone, an AC transformer; and
for each load zone:
a pair of switches that includes a first switch and a second switch, wherein the first switches and the second switches are operated complementary such that when the first switches are on, the second switches are off and when the second switches are on, the first switches are off; and
a bus capacitor connected in parallel with the load zone;

wherein each AC transformer is electrically connected to each other AC transformer providing an electrical path for each bus capacitor to discharge current to each other bus capacitor when a voltage across a bus capacitor is greater than a voltage across another bus capacitor.

17. The circuit of claim 16, further comprising a controller configured to repeatedly turn the first and second switches on and off according to a specified duty cycle.

18. The circuit of claim 16, wherein each switch comprises a metal-oxide-semiconductor field-effect transistor.

19. The circuit of claim 16, wherein the power balancer includes an individual voltage regulator for each load zone.

20. The circuit of claim 19, wherein the individual voltage regulator for each load zone is connected between the bus capacitor for the load zone and an input power connection to the load zone.

* * * * *